Dec. 13, 1927.

K. P. KVALVIK

ANIMAL TRAP

Filed May 11, 1927

1,652,444

INVENTOR
Kornelius P. Kvalvik
BY
ATTORNEY

Patented Dec. 13, 1927.

1,652,444

UNITED STATES PATENT OFFICE.

KORNELIUS P. KVALVIK, OF EDBERG, ALBERTA, CANADA.

ANIMAL TRAP.

Application filed May 11, 1927. Serial No. 190,426.

This invention relates generally to traps, and has more particular reference to a novel animal trap.

The invention has for an object the provision of an animal trap, which will act efficiently and effectively, and which is not readily likely to become broken.

The invention has for a further object, the provision of an animal trap, which can be manufactured and sold at a reasonable cost.

For further comprehension of the invention and of the objects and advantages thereof, reference will be had to the following description and accompanying drawings, and to the appended claims in which the various novel features of the invention are more particularly set forth.

Referring to the accompanying drawing, forming a material part of this disclosure:

Figure 1:
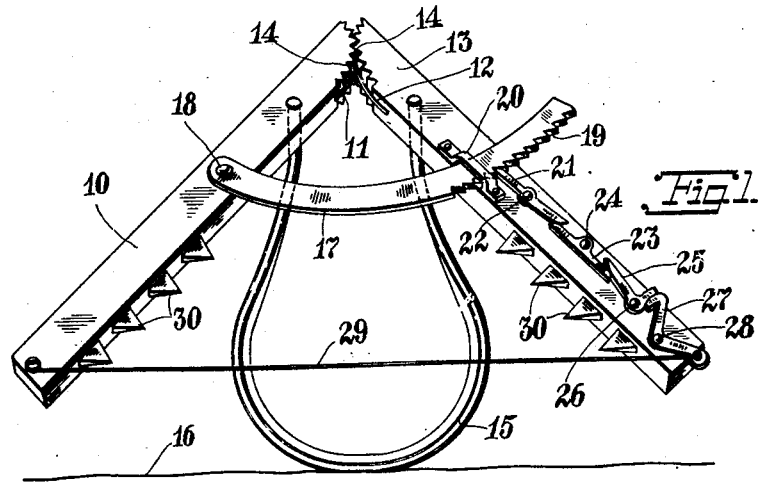
Fig. 1 is a perspective view of a device constructed according to this invention.
Figure 2:
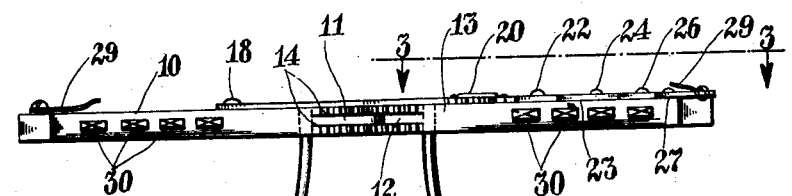
Fig. 2 is a front view thereof.
Figure 3:
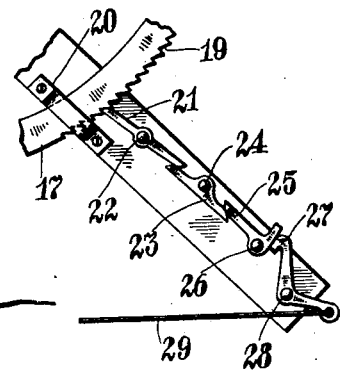
Fig. 3 is a fragmentary enlarged view, as seen looking in the direction of the arrows 3—3 of Fig. 2.

The reference numeral 10 indicates generally an arm formed at one end with a tongue 11 engaging in a groove 12, formed in a second arm 13. On each side of the tongue, and on each side of the groove, these arms are formed with serrations 14 extending from one edge to another edge in a curve, and engaging each other, so that the arms may swing as though pivoted at these ends.

A spring 15 substantially U-shaped has its upper ends engaged in the arms 10 and 13 normally acting to force the arms together using the serrated ends as a pivot. The lower end of the spring 15, may be attached to a support, indicated, by line 16, to support the device. An arcuate strip 17 is pivotally attached at one end, as at 18, to the arm 10, and the other end is provided with a serrated portion 19, and is slidably held to the arm 13 by a bracket 20 secured to the arm. The center of curvature of this arcuate strip coincides with the point of pivotal connection of the arms 10 and 13.

The forward end of a catch lever 21 engages one of the serrations 19, the catch lever being pivoted intermediate of its ends to the arm 13, as at 22 and the rearward end is engaged by the forward end of a second catch lever 23, also pivoted intermediate of its ends, as at 24 to the arm 13. The rearward end of the second catch lever 23 is engaged by the forward end of a third catch lever 25 pivoted near its rearward end, as at 26 to the arm 13. The forward end of a fourth catch lever 27 engages the rearward end of the third catch lever 25, and this fourth catch lever is also pivoted intermediate of its ends to the arm 13, as at 28. The rearward end of the fourth catch lever 27 has a string 29 attached thereto, and this string is drawn tightly across the front of the device and secured to the arm 10. The edges of the arms 10 and 13, facing each other are provided with teeth 30.

The operation of the device consists in placing bait, not shown on the drawing, to attract the animals on the support 16, between the arms 10, 13 and the string 29. An animal attempting to reach the bait, moves the string 29, swinging lever 27 about its pivot point 28. This causes the rearward end of lever 27 to release the forward end of lever 25, the forward end of 25 releases the rearward end of 23, the forward end of 23 releases the rearward end of 21, and the forward end of 21 moves free from the serrations 19. The spring 15 then swings the arms 10 and 13 together, and the teeth 30 embed themselves in the animal, holding the animal against escape.

Figure 4:
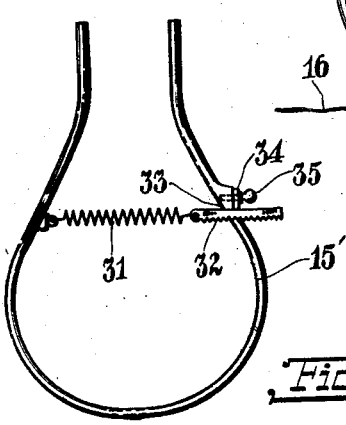
Fig. 4 is a front view of a modified form of spring for the invention device.

The modification illustrated in Fig. 4 discloses a means for varying the acting force of spring 15′ which may be used instead of spring 15. One of the arms of the spring 15′ has one end of an auxiliary spring 31 secured thereto, the other end of the auxiliary spring being attached to a rack 32 having its teeth on its bottom edge, and passing through an aperture 33 in the other arm of the spring 15′. The bottom of the aperture 33 is serrated to mesh with the teeth of the rack, and a wedge 34 is pivoted to the arm of the spring 15′ by a screw 35 adapted to secure in wedged position against displacement, the wedge being placeable in position to force the teeth of the rack against the serrations of the aperture 33 to hold the rack as adjusted, which determines the tension of auxiliary spring 31.

While I illustrated and described the preferred form, construction, and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention, what I claim as new and desire to secure by United States Letters Patent is:

1. A device of the class described, comprising an arm formed at one end with a tongue, a second arm formed at one end with a groove engaged by the tongue, the said arm ends being formed with serrations engaging each other, a spring acting between the arms, normally forcing the arms together, using the serrated ends as a pivot, and means between the arms for normally holding the arms apart.

2. A device of the class described, comprising an arm formed at one end with a tongue, a second arm formed at one end with a groove engaged by the tongue, the said arm ends being formed with serrations engaging each other, a spring acting between the arms, normally forcing the arms together, using the serrated ends as a pivot, and means between the arms for normally holding the arms apart, the said means being adjustable to control the distance at which the arms are held.

3. A device of the class described, comprising an arm formed at one end with a tongue, a second arm formed at one end with a groove engaged by the tongue, the said arm ends being formed with serrations engaging each other, a spring acting between the arms, normally forcing the arms together using the serrated ends as a pivot, and means between the arms for normally holding the arms apart, the said means being adjustable to control the distance at which the arms are held and the said means being releasable upon an animal abutting a certain element thereof.

4. In a device of the class described, a pair of arms abutting each other at one end and normally urged together by a spring, an arcuate strip pivotally attached to one of the arms, and slidably arranged on the other of the arms, the center of curvature of the arcuate strip coinciding with the point of rotation of the arms, serrations on the slidable end of the arcuate strip, a catch lever pivotally supported, having its forward end engaged on one of said serrations, a second pivoted catch lever having its forward end engaging the rearward end of the first catch lever, a third pivoted catch lever having its forward end engaging the rearward end of the second catch lever, a fourth pivoted catch lever having its forward end engaging the rearward end of the third catch lever, and a trip strip fastened at one end to the rearward end of the fourth catch lever.

5. A device of the class described, comprising an arm formed at one end with a tongue, a second arm formed at one end with a groove engaged by the tongue, the said arm ends being formed with serrations engaging each other, an adjustable spring acting between the arms, normally forcing the arms together using the serrated ends as a pivot, and means between the arms for normally holding the arms apart, the said means being adjustable to control the distance at which the arms are held and the said means being releasable upon an animal abutting a certain element thereof.

In testimony whereof I have affixed my signature.

KORNELIUS P. KVALVIK.